(12) United States Patent
Reijonen et al.

(10) Patent No.: US 11,665,806 B2
(45) Date of Patent: May 30, 2023

(54) BEAM ALIGNMENT SYSTEMS AND METHOD

(71) Applicant: Schlumberger Technology Corporation, Sugar Land, TX (US)

(72) Inventors: Jani Reijonen, Sugar Land, TX (US); Vincent Ernst, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 16/722,887

(22) Filed: Dec. 20, 2019

(65) Prior Publication Data
US 2021/0195723 A1    Jun. 24, 2021

(51) Int. Cl.
| | | |
|---|---|---|
| G01V 5/10 | (2006.01) | |
| G01V 5/12 | (2006.01) | |
| H05G 1/52 | (2006.01) | |
| H01J 35/14 | (2006.01) | |
| G01N 23/203 | (2006.01) | |

(52) U.S. Cl.
CPC .............. *H05G 1/52* (2013.01); *G01V 5/10* (2013.01); *G01V 5/12* (2013.01); *H01J 35/153* (2019.05); *G01N 2223/053* (2013.01); *G01N 2223/063* (2013.01); *G01N 2223/106* (2013.01); *G01N 2223/1016* (2013.01); *G01N 2223/304* (2013.01); *G01N 2223/616* (2013.01)

(58) Field of Classification Search
None
See application file for complete search history.

(56) References Cited

U.S. PATENT DOCUMENTS

| | | | | |
|---|---|---|---|---|
| 5,581,591 A | * | 12/1996 | Burke | H01J 35/10 378/135 |
| 10,062,467 B2 | * | 8/2018 | Tkabladze | G01V 5/12 |
| 10,295,700 B2 | * | 5/2019 | Beekman | G01V 5/12 |
| 10,866,337 B2 | * | 12/2020 | Simon | G01V 5/125 |

(Continued)

FOREIGN PATENT DOCUMENTS

| | | | | | |
|---|---|---|---|---|---|
| CN | 103250226 B | * | 2/2016 | ........... | H01J 35/153 |
| CN | 105609396 A | * | 5/2016 | ........... | H05G 1/52 |

OTHER PUBLICATIONS

How GPS Receivers Work—Trilateration vs Triangulation, downloaded from https://gisgeography.com/trilateration-triangulation-gps/ on Oct. 14, 2022 (12 pages).

*Primary Examiner* — Thomas R Artman
(74) *Attorney, Agent, or Firm* — Jeffrey D. Frantz (57) ABSTRACT

The present disclosure relates to a downhole tool that includes a first photon flux detector disposed at a first radial position about a longitudinal axis of the downhole tool that measures a first signal indicative of an x-ray flux of the x-ray photons. The downhole tool also includes a second photon flux detector disposed at a second radial position about the longitudinal axis of the downhole tool that measures a second signal indicative of the x-ray flux of the x-ray photons. Further, the downhole tool includes a controller communicatively coupled to the first photon flux detector and the second photon flux detector that determines a condition associated with the electron beam based at least in part on a relative x-ray flux from the first photon flux detector and the second photon flux detector.

13 Claims, 6 Drawing Sheets

(56) References Cited

U.S. PATENT DOCUMENTS

| | | | |
|---|---|---|---|
| 2017/0169909 A1* | 6/2017 | Tkabladze | G01V 5/12 |
| 2018/0003854 A1* | 1/2018 | Simon | G01V 5/125 |
| 2018/0188412 A1* | 7/2018 | Beekman | G01V 5/12 |
| 2019/0018166 A1* | 1/2019 | Teague | G01V 5/125 |
| 2021/0096275 A1* | 4/2021 | Simon | G01V 5/125 |
| 2021/0195723 A1* | 6/2021 | Reijonen | H01J 35/153 |

* cited by examiner

BEAM ALIGNMENT SYSTEMS AND METHOD

BACKGROUND

This disclosure relates generally to a downhole tool that generates x-rays to measure formation properties and, more particularly, to a downhole tool that includes at least two detectors that measures a photon flux indicative of a position of an electron beam on a target.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light and not as admissions of any kind.

Producing hydrocarbons from a wellbore drilled into a geological formation is a remarkably complex endeavor. During drilling operations, evaluations of the geological formation may be performed for various purposes, such as to locate hydrocarbon-producing formations and manage the production of hydrocarbons from these formations. To determine the location of hydrocarbon producing formations, as well as various geological formations, downhole tools are conveyed by various means, such as coiled tubing, drill pipe, casing or other conveyers.

A formation density tool may be deployed within the sub-surface to measure physical properties of a surrounding geological formation. The formation density tool may be moved within a borehole drilled in the geological formation. For example, the formation density tool may be pushed farther into the borehole and/or pulled to remove the formation density tool from the borehole. The formation density tool may include a source to emit high-energy photons into the geological formation. Some of the high-energy photons may interact with the geological formation and may then be detected by detectors on the formation density tool. The physical properties of the geological formation may be determined from the characteristics of the detected high-energy photons.

Determining an amount of high-energy photons being emitted by the source may improve the accuracy of the determined physical properties of the geological formation. However, conditions within the geological formation, such as pressure and temperature, mechanical stress imparted on the downhole tool, and variations in the output of the components of the downhole tool, such as the source, may make it difficult to determine the amount of high-energy photons being emitted by the source.

SUMMARY

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

One embodiment of the present disclosure relates to a downhole tool that includes a radiation generator that emits radiation. The downhole tool may also include a first flux detector at a first radial position about a longitudinal axis of the downhole tool, wherein the first photon detector measures a first signal indicative of a flux of the radiation. Further, the downhole tool may include a second flux detector at a second radial position about the longitudinal axis of the downhole tool, wherein the second flux detector measures a second signal indicative of the flux of the radiation. Additionally, the downhole tool may include a controller communicatively coupled to the first flux detector and the second flux detector, wherein the controller determines a condition associated with the radiation generator based at least in part on a relative flux from the first flux detector and the second flux detector.

Another embodiment of the present disclosure relates to a method. The method includes receiving, via a processor, a first signal from a first detector, wherein the first signal is indicative of an x-ray flux of x-ray photons emitted by a target. The method also includes receiving, via the processor, a second signal from a second detector, wherein the second signal is indicative of the x-ray flux of x-ray photons emitted by the target. Further, the method includes receiving, via the processor, a third signal from a third detector, wherein the third signal is indicative of the x-ray flux of x-ray photons emitted by the target. Further still, the method includes determining, via the processor, a condition associated with electron beam on the target based at least in part on a relative flux of the first signal, the second signal, and the third signal.

Another embodiment of the present disclosure relates to a system. The system includes an electronic photon generator having a cathode that emits an electron beam. The electronic photon generator also includes a target that generates x-ray photons when struck by the electrons. The system also includes a first photon flux detector disposed at a first radial position about a longitudinal axis of a downhole tool, wherein the first photon flux detector measures a first signal indicative of an x-ray flux of the x-ray photons. Further, the system includes a second photon flux detector disposed at a second radial position about the longitudinal axis of the downhole tool, wherein the second photon flux detector measures a second signal indicative of the x-ray flux of the x-ray photons. Further still, the system includes a third photon flux detector disposed at a third radial position about the longitudinal axis of the downhole tool, wherein the third photon flux detector measures a third signal indicative of the x-ray flux of the x-ray photons. Even further, the system includes a controller communicatively coupled to the first photon flux detector and the second photon flux detector, wherein the controller determines a condition associated with the electron beam based at least in part on a relative x-ray flux from the first photon flux detector, the second photon flux detector, and the third photon flux detector.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are examples of the presently disclosed techniques. Additionally, in an effort to provide a concise description of these embodiments, not all features of an actual implementation may be described in the specification. It should be appreciated that in the development of any such actual implementation, as in any engineering or design project, numerous implementation-specific decisions will be made to achieve the developers' specific goals, such as compliance with system-related and business-related constraints, which may vary from one implementation to another. Moreover, it should be appreciated that such a development effort might be complex and time consuming, but would still be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As mentioned above, a downhole tool that measures properties of a geological formation, such as a formation density. In particular, the downhole tool may include an electron beam that strikes a target, causing the target to emit photonic radiation, such as x-rays. The magnitude of the photon flux emitted by the target is used to measure the properties of the geological formation. An expected photon flux of existing downhole tools may be calibrated at the surface or a background measurement may be received downhole. That is, the downhole tool may be operated on a sample with a known composition and a known expected signal and an operator may tune the expected photon flux emitted by the downhole tool based on the performance of the downhole tool with the sample. In some cases, the photon flux may vary when the downhole tool is positioned with the wellbore due to conditions within the wellbore. Moreover, it may be difficult to determine the relative change of the flux.

Accordingly, the present disclosure relates to a beam alignment system for a downhole tool that measures properties of a geological formation, such as a formation density. In general, the beam alignment system includes two or more photon flux detectors disposed at different radial positions about an axis normal to a surface of the target. Each detector of the two or more detectors measures a signal indicative of a photon flux at the respective position of the respective detector. A controller communicatively coupled to the two or more detectors may determine a condition associated with the electron beam (e.g., an alignment, a striking position of the electron beam on the target, and the like) of the downhole based at least in part on the respective signal measured by the two or more detectors. In some examples, the controller may determine the condition associated with the electron beam based at least in part on a respective position of the two or more detectors. In some example, the respective position of the two or more detectors may be different or substantially equal radial distances from the axis normal to a surface of the target. In some examples, the controller may generate and/or output a signal correction factor that may modify an expected output of the photons emitted by the detector. Additionally, or alternatively, the controller may generate and/or output a control signal that modifies a condition associated with the electron beam (e.g., modifying a voltage of an electron accelerator associated with the electron beam). As such, the beam alignment system of the present disclosure may improve the accuracy of certain downhole tools as well as improve the operations of the downhole tools while the downhole tools are within a wellbore.

Figure 1:
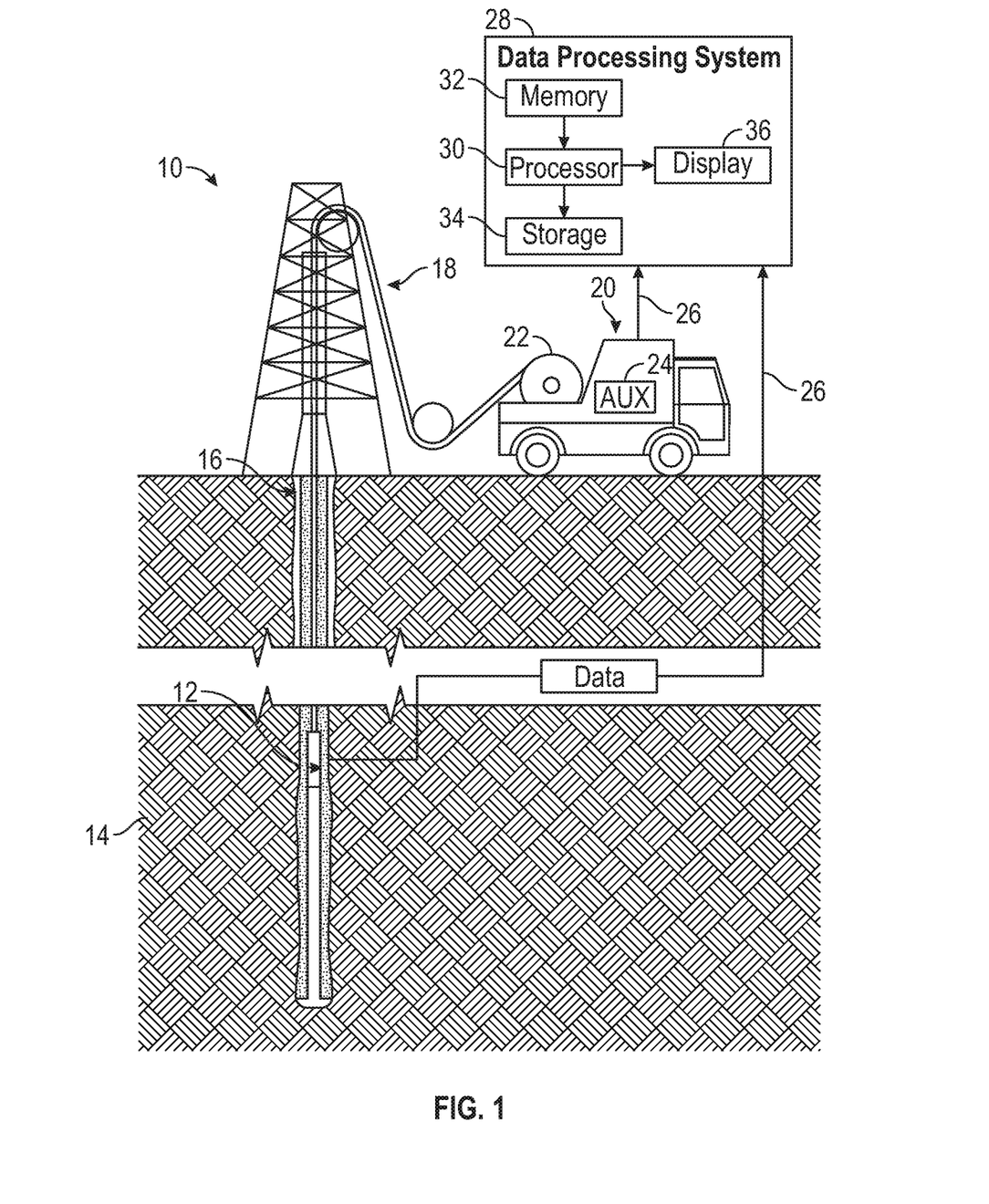
FIG. 1 is a schematic diagram of a drilling system that includes a downhole tool to detect characteristics of a geological formation adjacent to the downhole tool, in accordance with an embodiment.

With this in mind, FIG. 1 illustrates a well-logging system 10 that may employ the systems and methods of this disclosure. The well-logging system 10 may be used to convey a downhole tool 12 through a geological formation 14 via a wellbore 16. The downhole tool 12 is conveyed on a cable 18 via a logging winch system 20. Although the logging winch system 20 is schematically shown in FIG. 1 as a mobile logging winch system carried by a truck, the logging winch system 20 may be substantially fixed (e.g., a long-term installation that is substantially permanent or modular). Any suitable cable 18 for well logging may be used. The cable 18 may be spooled and unspooled on a drum 22 and an auxiliary power source 24 may provide energy to the logging winch system 20 and/or the downhole tool 12.

Although the downhole tool 12 is described as a wireline downhole tool, it should be appreciated that any suitable conveyance may be used. For example, the downhole tool 12 may instead be conveyed as a logging-while-drilling (LWD) tool as part of a bottom hole assembly (BHA) of a drill string, conveyed on a slickline or via coiled tubing, and so forth. For the purposes of this disclosure, the downhole tool 12 may be any suitable measurement tool that uses a detector to obtain measurements of properties of the geological formation 14.

As discussed further below, the downhole tool 12 may emit radiations, such as x-rays gamma-rays, and/or neutrons, into the geological formation 14, which are detected by the downhole tool 12 as data 26 relating to the wellbore 16 and/or the geological formation 14. The data 26 may be sent to a data processing system 28. The data processing system 28 may be any electronic data processing system that can be used to carry out the systems and methods of this disclosure. For example, the data processing system 28 may include a processor 30, which may execute instructions stored in memory 32 and/or storage 34. As such, the memory 32 and/or the storage 34 of the data processing system 28 may be any suitable article of manufacture that can store the instructions. The memory 32 and/or the storage 34 may be read-only memory (ROM), random-access memory (RAM), flash memory, an optical storage medium, or a hard disk drive, to name a few examples. A display 36, which may be any suitable electronic display, may display the images generated by the processor 30. The data processing system 28 may be a local component of the logging winch system 20 (e.g., within the downhole tool 12), a remote device that analyzes data from other logging winch systems 20, a device located proximate to the drilling operation, or any combination thereof. In some embodiments, the data processing system 28 may be a mobile computing device (e.g., tablet, smartphone, or laptop) or a server remote from the logging winch system 20.

Figure 2:
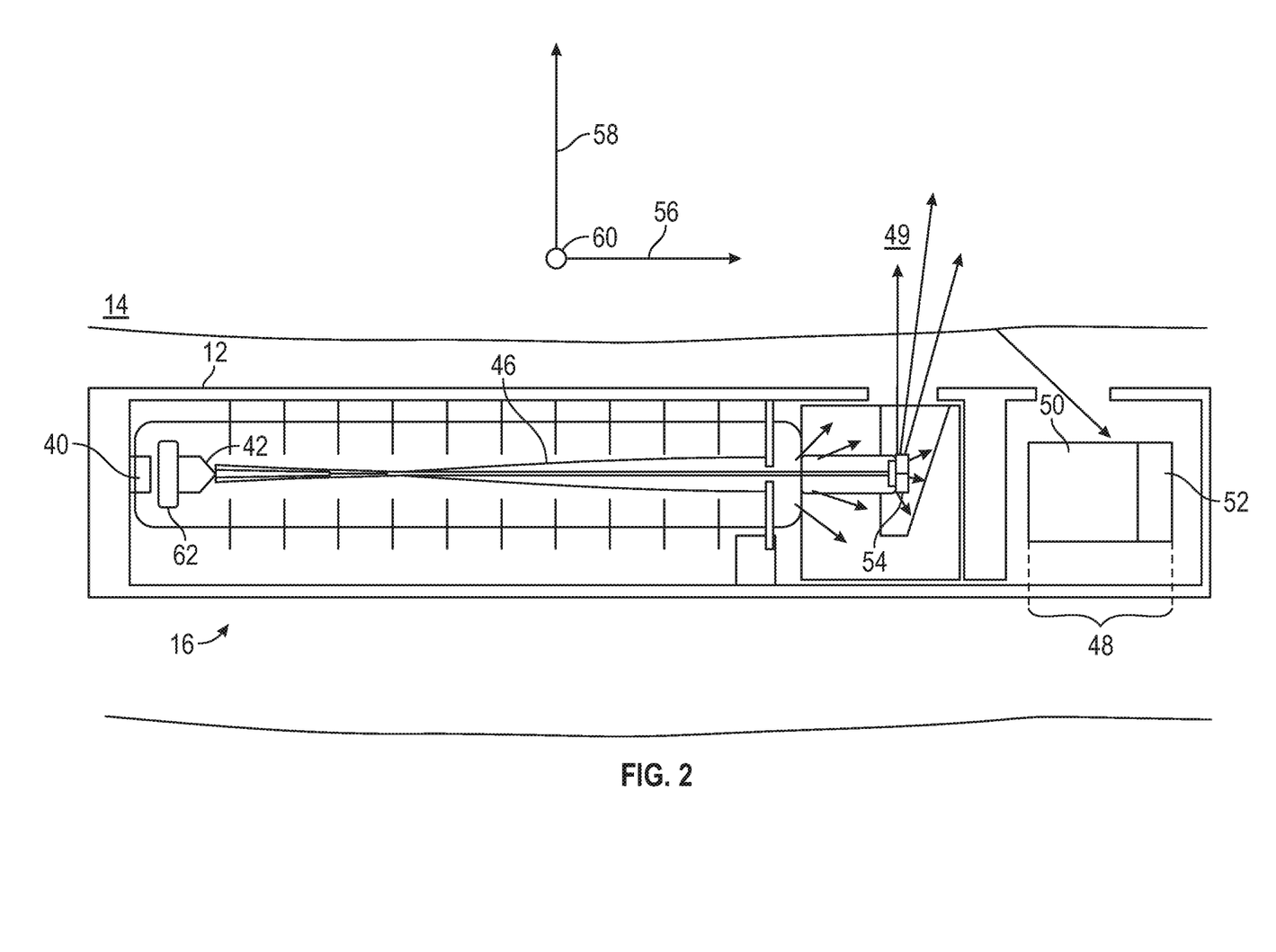
FIG. 2 is a schematic diagram of the downhole tool of FIG. 1, in accordance with an embodiment.

FIG. 2 is a schematic diagram of the downhole tool 12 that detects physical characteristics of the geological formation 14. The downhole tool 12 may include a voltage generator 40 that may generate voltages of 150 kV, 200 kV, or any other voltage suitable to form an electric field between a cathode 42 and a target 44 (e.g., anodes).

To determine the properties of the geological formation 14, the downhole tool 12 may emit photons into the geological formation 14 to interact with the geological formation 14. For example, the cathode 42 may emit electrons in an electron beam 46 (e.g., stream of electrons) between the cathode 42 and the target 44. Due to a voltage difference between the cathode 42 and the target 44, the electrons of the electron beam 46 may travel from the cathode 42, through the electric field, to the target 44. While described as being a cathode 42 that emits electrons in an electron beam, it should be noted that in some embodiments the cathode 42 may be a radiation generator that emits radiation such as neutrons.

As the electrons in the electron beam 46 decelerate due to contacting (e.g., colliding with) the target 44, which may be gold (Au), Tungsten, or the like, the deceleration may cause photons 49, such as high-energy photons (e.g., X-rays) to be emitted as Bremsstrahlung radiation. At least some of the photons 49 may be high-energy photons at an energy sufficient to cause at least a portion of the photons 49 to inelastically scatter off elements of the geological formation 14 and to be absorbed by a detector 48 (e.g., Compton scattering), such as an x-ray detector. The detector 48 may include a scintillator 50 that absorbs the photons 49 and emits light based on the energy of the absorbed photons 49. For example, each emission of light may count as a detected photon (e.g., thereby adding one to a count rate of the detector 48). Further, the detector 48 may include a photomultiplier 52 operatively coupled to the scintillator 50 to detect the light emitted by the scintillator 50. The photomultiplier 52 may output an electrical signal from the detected light of the scintillator 50 to the data processing system 28. As mentioned above, the data processing system 28 may process the electrical signals from the photomultiplier 52 at the surface (e.g., as the data 26), at the downhole tool 12, or a combination thereof. As such, the downhole tool 12 may include hardware similar to the data processing system 28 (e.g., processor 30, memory 32, storage 34, etc.) In some embodiments, the detector 48 may be communicatively coupled to the data processing system 28 to communicate the data 26 related to the electrical signals indicative of the detected photons 49.

As shown in the illustrated example, the downhole tool 12 includes multiple photon flux detectors 54 (e.g., flux detectors). In general, each photon flux detector of the multiple photon flux detectors 54 measures a signal indicative of a photon flux (e.g., radiation flux) of the photons 49 emitted by the target 44. As discussed in more detail below with regards to FIGS. 3-7, the measured signal from each photon flux detector of the multiple photon flux detectors 54 may be received by the data processing system 28 (e.g., specifically the processor 30) and used to determine a condition of the electron beam 46 (e.g., an alignment of the electron beam 46, a position on the target 44 where the electron beam 46 is striking) as well as to generate a correction signal (e.g., a signal correction and/or control signals to adjust an electric field generated by the electron beam steering control system 62, causing the electron beam 46 to change alignment). In some embodiments, the data processing system 28, in response to determining that the electron beam 46 is striking the target 44 at position that does not provide a predetermined threshold of x-ray flux, the data processing system may output an alert, such as an error signal, to an operator via a suitable display coupled to the data processing system 28. As discussed above, in some embodiments, the downhole tool 12 may include a radiation generator that emits neutrons. In such embodiments, the photon flux detector 54 may be a flux detector that measures a radiation flux.

Figure 3:
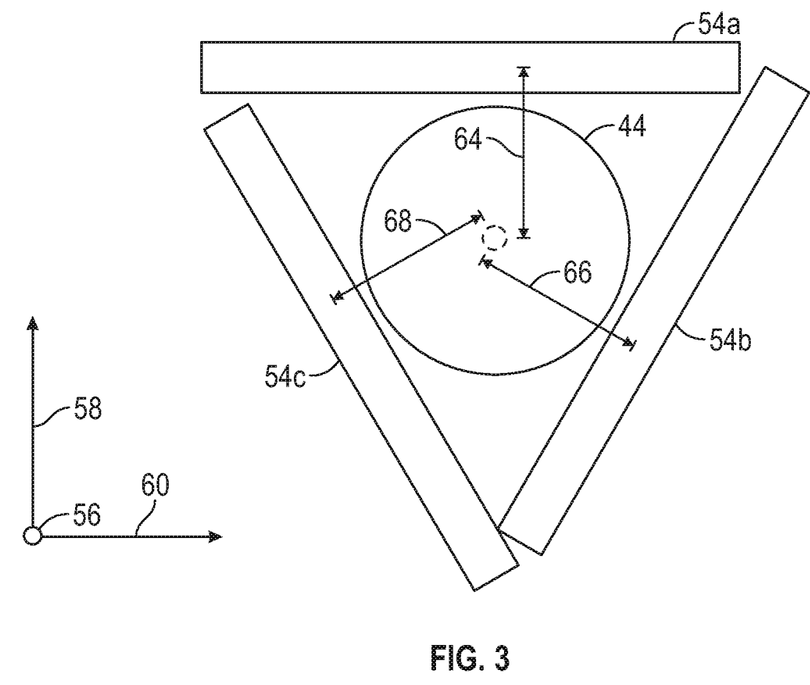
FIG. 3 is a perspective view of the target and the photon flux detectors taken along a longitudinal axis of the downhole tool, in accordance with an embodiment of the present disclosure.

As shown in the example, the photon flux detector of the multiple photon flux detectors 54 are each disposed at a different radial position (e.g., not overlapping) about the longitudinal axis 56, as discussed in more detail with regard to FIG. 3. That is, each photon flux detector of the multiple photon flux detectors 54 may be at a different position along the first transversal axis 58 and/or the second transversal axis 60. As shown in the example, the multiple photon flux detectors 54 are disposed near the target 44. However, it should be noted that, in some embodiments, one or all of the multiple photon flux detectors may be offset (e.g., separated) from the target along the longitudinal axis 56.

As discussed above, each photon flux detector of the multiple photon flux detectors 54 may be disposed at a different radial position about the longitudinal axis 56 of the downhole tool 12. To illustrate this, FIG. 3 is a schematic diagram showing a perspective view of multiple photon flux detectors 54 along the longitudinal axis 56. It should be noted that while three photon flux detectors 54 are shown, in some embodiments there may be two photon flux detectors 54 or more than three photon flux detectors (e.g., 4, 5, 6, 7, 8, etc.). As shown in the example, the photon flux detector 54a, the photon flux detector 54b, and the photon flux detector 54c are disposed at different radial positions (e.g., along the first transversal axis 58 and/or the second transversal axis 60) about the longitudinal axis 56. More specifically, the photon flux detector 54a is disposed at a first radial position about the longitudinal axis 56 that is a first distance 64 from the center of the target 44, the photon flux detector 54b is disposed at a second radial position about the longitudinal axis 56 that is a second distance 66 from the center of the target 44, and the photon flux detector 54c is disposed at a third radial position about the longitudinal axis 56 that is a third distance 68 from the center of the target 44. As discussed in more detail below, the relative photon flux measured by each photon flux detector 54 may be used to determine a condition of the electron beam 46, such as a position where the electron beam 46 is striking the target 44.

For example, by arranging multiple detectors around a target (e.g., the target 44) at a set distance (e.g., the first distance 64, the second distance 66, and the third distance 68) the variation of the total flux of x-rays or neutrons and the position of the center of the electron beam may be calculated. The positions of the three detectors (e.g., photon flux detectors 54) labeled as (a, b, and c) may be defined as (x1, y1, 0), (0, 0, 0), and (x2, 0, 0) and the center of the electron beam on the surface of the target may be defined as (x, y, 0). Each photon flux detector 54 may measure a current that is proportional to the x-ray flux and quadratic to the distance from the center of the e-beam on the surface of the target. As such, the following relationship may hold:

$$\left(\frac{ax}{cx}\right)^2 = \frac{I_c}{I_a} \qquad (1)$$

$$\left(\frac{ax}{bx}\right)^2 = \frac{I_b}{I_a}$$

$$\left(\frac{bx}{cx}\right)^2 = \frac{I_c}{I_b}$$

Using the equations above, three trilateration circles may be defined as:

$$x^2 + y^2 = (bx)^2 \qquad (2)$$

$$(x - x_1)^2 + (y - y_1)^2 = (ax)^2 = \frac{I_b}{I_a}(bx)^2$$

$$(x - x_2)^2 + y^2 = (cx)^2 = \frac{I_b}{I_c}(bx)^2$$

Expanding the squares and subtracting the first equation of (2) from the second equation of (2), and the first equation of (2) from the third equation of (2) may provide equations of two intersecting lines:

$$x = -\frac{y_1}{x_1}y + \frac{x_1^2 + y_1^2 + (bx)^2\left(1 - \frac{I_b}{I_a}\right)}{2x_1} \qquad (3)$$

$$x = \frac{x_2^2 + (bx)^2\left(1 - \frac{I_b}{I_c}\right)}{2x_2}$$

Since these two lines represented by the equations in (3) intersect, the equations of the lines in (3) may be used to find the y coordinate of the intersecting point:

$$y = \frac{x_1^2 + y_1^2 - x_1 x_2 + (bx)^2\left\{\left(1 - \frac{I_b}{I_a}\right) - \frac{x_1}{x_2}\left(1 - \frac{I_b}{I_c}\right)\right\}}{2y_1} \qquad (4)$$

This provides an expression of the position of the electron beam 46 on the target 44 as a function of the distance bx. To solve for the distance bx, the first equation in (2) may be substituted into (4) and the resulting quadratic equation may be solved and, thus, relating the positions of the photon flux detectors 54 to the measured signal indicative of the x-ray flux.

It should be noted that the discussion above is not limited to when the photon flux detectors are each disposed at equal distances about a common point of the target 44 (e.g., the center of the target 44). That is, in some embodiments, at least two of the photon flux detectors 54 may be disposed at equal distances. For example, referring briefly back to FIG. 3, in some embodiments, the first distance 64 and the second distance 66 may be equal, the second distance 66 and the third distance 68 may be equal, or the first distance 64 and the third distance 68 may be equal. Alternatively, none of the distances between the photon flux detectors 54 and a (e.g., the first distance 64, the second distance 66, and the third distance 68) may be equal. In any case, the data processing system 28 may be calibrated such that the storage 34 and/or memory 32 includes the radial positions (e.g., the first distance 64 from the center of the target 44 about the longitudinal axis 56, the second distance 66 from the center of the target 44 about the longitudinal axis 56, and the third distance 68 from the center of the target 44 about the longitudinal axis 56).

As generally discussed above, a relative x-ray measured by each photon flux detector of the multiple photon flux detectors 54 may be used by the data processing system 28 to determine a condition of the electron beam 46, such as a position where the electron beam 46 is striking the target 44.

Figure 4:
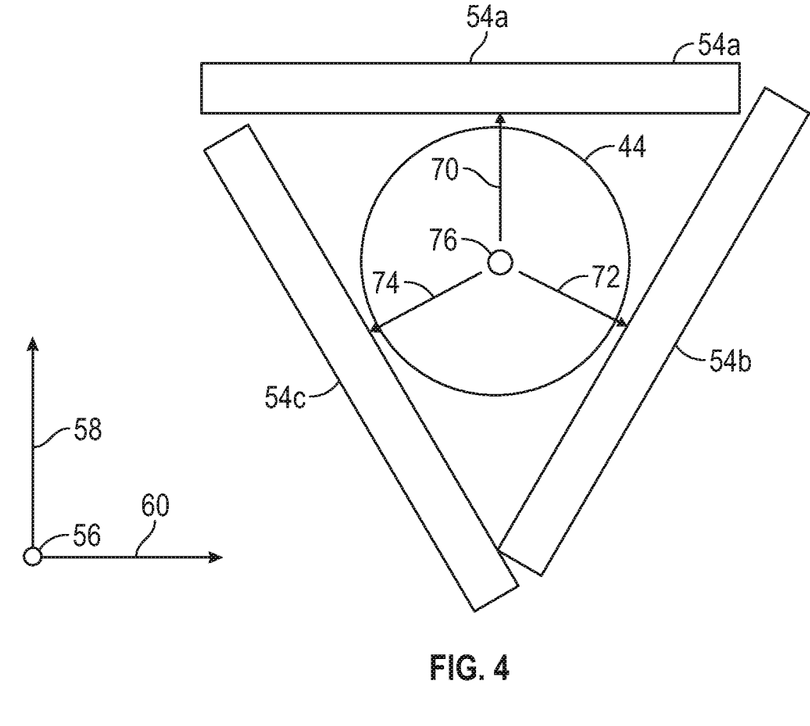
FIG. 4 is a perspective view of the target and the photon flux detectors taken along a longitudinal axis of the downhole tool, where the electron beam is striking a first position of the target, in accordance with an embodiment of the present disclosure.

To illustrate this, FIG. 4 is a schematic diagram showing a perspective view of multiple photon flux detectors 54 at different radial positions (e.g., along the first transversal axis 58 and/or the second transversal axis 60) about the longitudinal axis 56. In the example, each photon flux detector 54 is disposed at an equal distance from the center of the target 44 (e.g., the first distance 64, the second distance 66, and the third distance 68, as described above with regard to FIG. 3). However, it should be noted that in some instances, the distances of each photon flux detector 54 from the center of the target may be different or at least two of the distances may be the same.

As also shown in the example, the photon flux detector 56a measures a first signal 70 (e.g., indicated by a direction and magnitude of the arrow) indicative of an x-ray flux of the x-rays emitted by the target 44 in response to the electron beam 46 (not shown) striking the target 44, the photon flux detector 56b is measuring a second signal 72 (e.g., indicated by a direction and magnitude of the arrow) indicative of an x-ray flux of the x-rays emitted by the target 44 in response to the electron beam 46 striking the target 44, and the photon flux detector 56c is measuring a third signal 74 (e.g., indicated by a direction and magnitude of the arrow) indicative of an x-ray flux of the x-rays emitted by the target 44 in response to the electron beam 46 striking the target 44. In particular, the respective magnitude of the first signal 70, the second signal 72, and the third signal 74 are substantially equal (e.g., as indicated by the respective magnitude of the arrows for the first signal 70, the second signal 72, and the third signal 74). As such, the data processing system 28, after receiving the first signal 70, the second signal 72, and the third signal 74, may determine that a position 76 associated with where the electron beam 46 is striking the target. In this case, as the respective magnitude of the first signal 70, the second signal 72, and the third signal 74 are equal (e.g., and the distance between each photon flux detector 54 from the center is the same) the data processing system 28 may determine that the position 76 is approximately in the center of the target.

Figure 5:
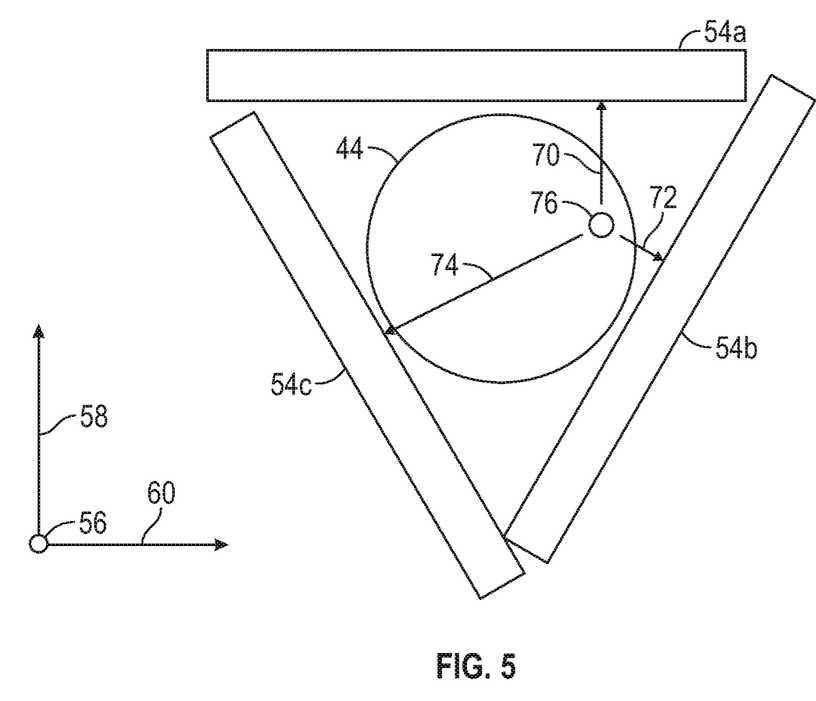
FIG. 5 is a perspective view of the target and the photon flux detectors taken along a longitudinal axis of the downhole tool, where the electron beam is striking a second position of the target, in accordance with an embodiment of the present disclosure.

As another non-limiting example, FIG. 5 is a schematic diagram showing a perspective view of multiple photon flux detectors 54 at different radial positions (e.g., along the first transversal axis 58 and/or the second transversal axis 60) about the longitudinal axis 56. In the example, each photon flux detector 54 is disposed at an equal distance from the center of the target 44 (e.g., the first distance 64, the second distance 66, and the third distance 68, as described above with regard to FIG. 3). However, it should be noted that in some instances, the distances of each photon flux detector 54 may be different or at least two of the distances may be the same.

As also shown in the example, the photon flux detector 56a is measuring a first signal 70 indicative of an x-ray flux of the x-rays emitted by the target 44 in response to the electron beam 46 (not shown) striking the target 44, the photon flux detector 56b is measuring a second signal 72 indicative of an x-ray flux of the x-rays emitted by the target 44 in response to the electron beam 46 striking the target 44, and the photon flux detector 56c is measuring a third signal 74 indicative of an x-ray flux of the x-rays emitted by the target 44 in response to the electron beam 46 striking the target 44. In particular, the respective magnitude of the first signal 70, the second signal 72, and the third signal 74 are different (e.g., as indicated by the respective magnitude of the arrows for the first signal 70, the second signal 72, and the third signal 74). As such, the data processing system 28, after receiving the first signal 70, the second signal 72, and the third signal 74, may determine that a position 76 associated with where the electron beam 46 is striking the target. In this case, as the respective magnitude of the first signal 70, the second signal 72, and the third signal 74 are different (e.g., and the distance between each photon flux detector 54 from the center is the same) the data processing system 28 may determine that the position 76 as shown in the illustrated example (e.g., generally away from the center and the distance between the position 76 and each photon flux detector 54 is not equal).

Figure 6:
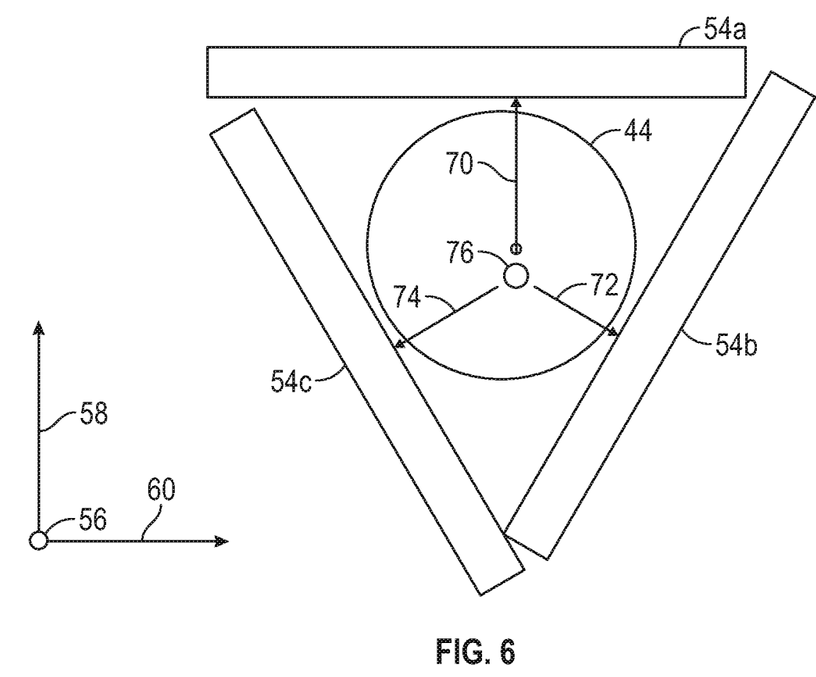
FIG. 6 is a perspective view of the target and the photon flux detectors taken along a longitudinal axis of the downhole tool, where the electron beam is striking a third position of the target, in accordance with an embodiment of the present disclosure.

As another non-limiting example, FIG. 6 is a schematic diagram showing a perspective view of multiple photon flux detectors 54 at different radial positions (e.g., along the first transversal axis 58 and/or the second transversal axis 60) about the longitudinal axis 56. In the example, each photon flux detector 54 is disposed at an equal distance from the center of the target 44 (e.g., the first distance 64, the second distance 66, and the third distance 68, as described above with regard to FIG. 3). However, it should be noted that in some instances, the distances of each photon flux detector 54 may be different or at least two of the distances may be the same.

As also shown in the example, the photon flux detector 56a is measuring a first signal 70 indicative of an x-ray flux of the x-rays emitted by the target 44 in response to the electron beam 46 (not shown) striking the target 44, the photon flux detector 56b is measuring a second signal 72 indicative of an x-ray flux of the x-rays emitted by the target 44 in response to the electron beam 46 striking the target 44, and the photon flux detector 56c is measuring a third signal 74 indicative of an x-ray flux of the x-rays emitted by the target 44 in response to the electron beam 46 striking the target 44. In particular, the magnitude of the first signal 70 is different that the respective magnitude of the second signal 72 and the third signal 74 (e.g., as indicated by a respective length of the arrows for the first signal 70, the second signal 72, and the third signal 74). As such, the data processing system 28, after receiving the first signal 70, the second signal 72, and the third signal 74, may determine that a position 76 associated with where the electron beam 46 is striking the target. In this case, as the magnitude of the first signal 70 is different than the respective magnitude of the second signal 72 and the third signal 74 (e.g., and the distance between each photon flux detector 54 from the center is the same) the data processing system 28 may determine the position 76 as shown in the illustrated example (e.g., approximately equal distance from the photon flux detector 54b and the photon flux detector 54c).

Figure 7:
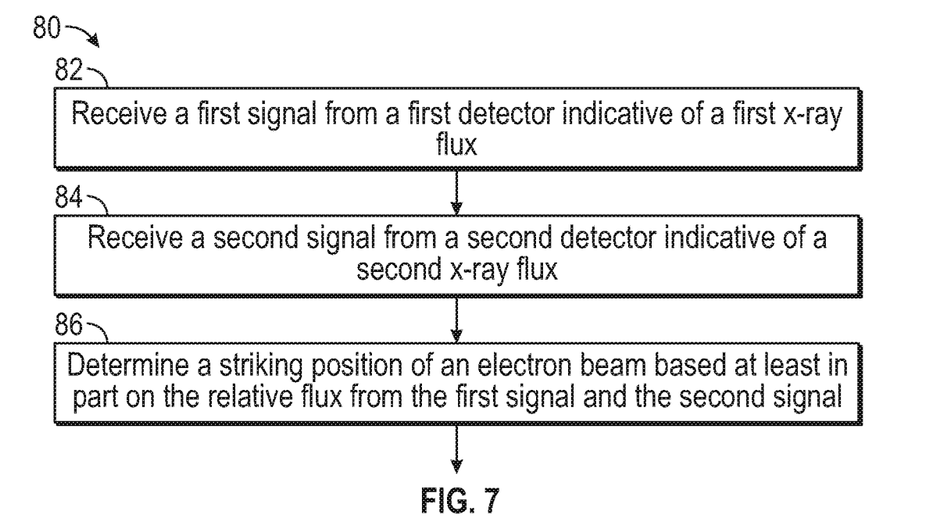
FIG. 7 is a flow chart representing an example of a process for determining a striking position of an electron beam, in accordance with an embodiment of the present disclosure.

Keeping the above in mind, FIG. 7 is a flow chart 80 representing a method for using a downhole tool 12 having at least two photon flux detectors 54 that measure radiation emitted from a target (e.g., the target 44). The flow chart 80 includes receiving (process block 82) a first signal from a first detector indicative of a first x-ray flux. For example, the data processing system 28 (e.g., the processor 30), or any suitable controller and/or control system having a suitable processor, may receive the first signal from the photon flux detector 54a at a first radial position, as described in FIGS. 4-6. The flow chart 80 also includes receiving (process block 84) a second signal from a second detector indicative of a second x-ray flux. For example, the data processing system 28 may receive the second signal from the photon flux detector 54b at a second radial position, as described in FIGS. 4-6. Then, after receiving the first signal and the second signal, the data processing system 28 may determine (process block 86) a striking position of an electron beam (e.g., electron beam 46) based at least in part on the first signal and the second signal. In some embodiments, the data processing system 28 may also receive a third signal from a third photon flux detector, such as the photon flux detector 54c, as described in FIGS. 4-6.

Figure 8:
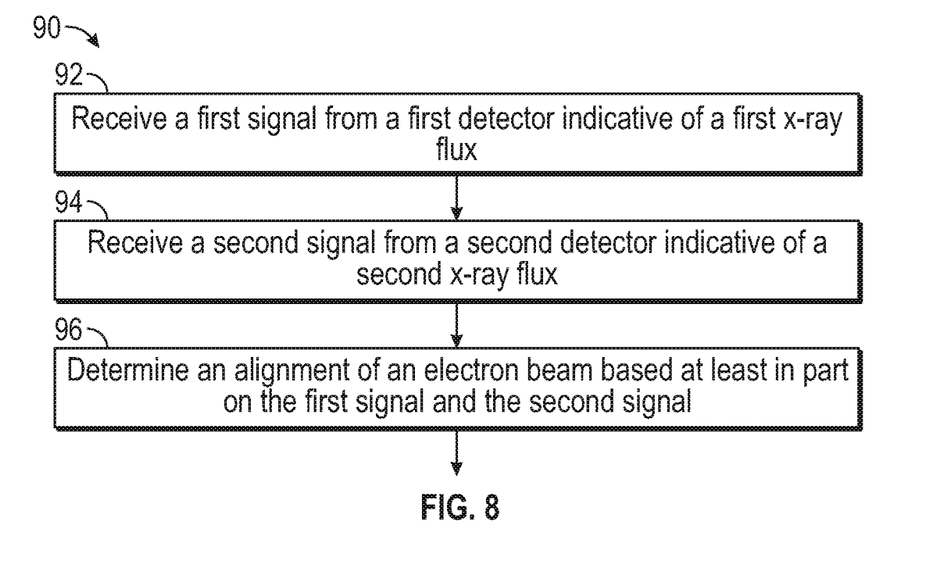
FIG. 8 is a flow chart representing an example of a process for determining an alignment of the electron beam, in accordance with an embodiment of the present disclosure.

FIG. 8 is a flow chart 90 representing a method for using a downhole tool 12 having at least two photon flux detectors 54 that measure radiation emitted from a target (e.g., the target 44). The flow chart 90 includes receiving (process block 92) a first signal from a first detector indicative of a first x-ray flux. For example, the data processing system 28 (e.g., the processor 30), or any suitable controller and/or control system having a suitable processor, may receive the first signal from the photon flux detector 54a at a first radial position, as described in FIGS. 4-6. The flow chart 90 also includes receiving (process block 94) a second signal from a second detector indicative of a second x-ray flux. For example, the data processing system 28 may receive the second signal from the photon flux detector 54b at a second radial position, as described in FIGS. 4-6. Then, after receiving the first signal and the second signal, the data processing system 28 may determine (process block 96) an alignment of an electron beam (e.g., electron beam 46), such as an angle of a collimated the electron beam 46 relative to an axis (e.g., the longitudinal axis 56) based at least in part on the first signal and the second signal. In some embodiments, the data processing system 28 may also receive a third signal from a third photon flux detector, such as the photon flux detector 54c, as described in FIGS. 4-6.

Figure 9:
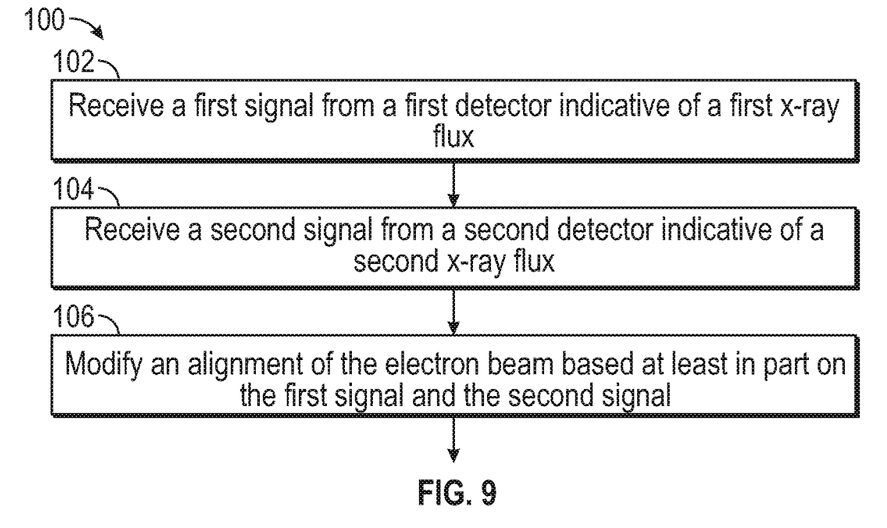
FIG. 9 is a flow chart representing an example of a process for modifying an alignment of the electron beam, in accordance with an embodiment of the present disclosure.

FIG. 9 is a flow chart 100 representing a method for using a downhole tool 12 having at least two photon flux detectors 54 that measure radiation emitted from a target (e.g., the target 44). The flow chart 100 includes receiving (process block 102) a first signal from a first detector indicative of a first x-ray flux. For example, the data processing system 28 (e.g., the processor 30), or any suitable controller and/or control system having a suitable processor, may receive the first signal from the photon flux detector 54a at a first radial position, as described in FIGS. 4-6. The flow chart 90 also includes receiving (process block 104) a second signal from a second detector indicative of a second x-ray flux. For example, the data processing system 28 may receive the second signal from the photon flux detector 54b at a second radial position, as described in FIGS. 4-6. Then, after receiving the first signal and the second signal, the data processing system 28 may modify (process block 106) an alignment of an electron beam (e.g., electron beam 46) based at least in part on the first signal and the second signal. That is, the data processing system 28 may generate a control signal that includes instructions that cause the beam steering control system 62 to modify an alignment of the electron beam 46. In some embodiments, the data processing system 28 may also receive a third signal from a third photon flux detector, such as the photon flux detector 54c, as described in FIGS. 4-6.

To modify the alignment of the electron beam 46, the data processing system 28 may transmit a control signal to the beam steering control system 62 causing the beam steering control system 62 to induce an electric field in a direction perpendicular to the longitudinal axis 56 (e.g., perpendicular to the x-ray tube axis) using electrodes at a variable potential. In some embodiments, the control signal may cause the electron beam steering control system 62 to modify the alignment of the electron beam 46 by applying a magnetic field via one or more coils proximate to the coil (e.g., using one or more steerer magnets disposed near and coupled to the electron beam steering control system).

Figure 10:
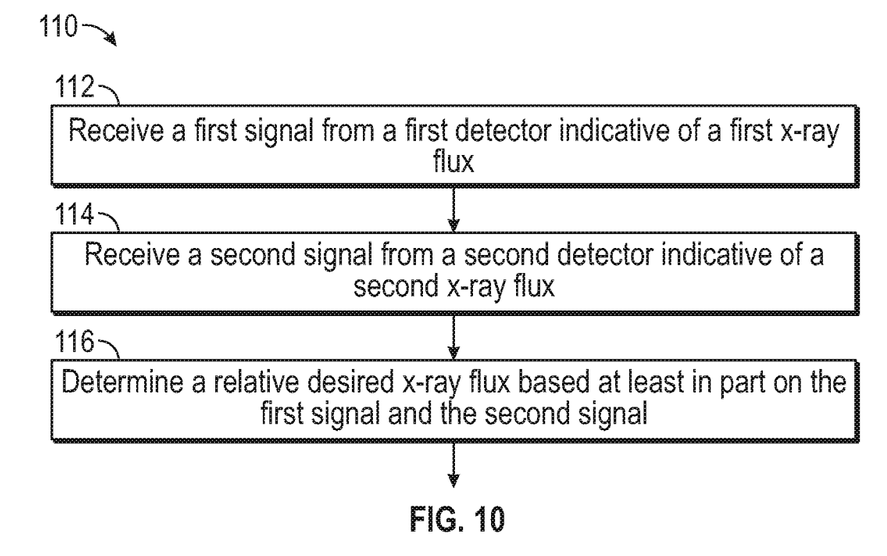
FIG. 10 is a flow chart representing an example of a process for determining a relative desired x-ray flux, in accordance with an embodiment of the present disclosure.

FIG. 10 is a flow chart 110 representing a method for using a downhole tool 12 having at least two photon flux detectors 54 that measure radiation emitted from a target (e.g., the target 44). The flow chart 110 includes receiving (process block 112) a first signal from a first detector indicative of a first x-ray flux. For example, the data processing system 28 (e.g., the processor 30), or any suitable controller and/or control system having a suitable processor, may receive the first signal from the photon flux detector 54a at a first radial position, as described in FIGS. 4-6. The flow chart 90 also includes receiving (process block 114) a second signal from a second detector indicative of a second x-ray flux. For example, the data processing system 28 may receive the second signal from the photon flux detector 54b at a second radial position, as described in FIGS. 4-6. Then, after receiving the first signal and the second signal, the data processing system 28 may determine (process block 116) a relative desired x-ray flux based at least in part on the first signal and the second signal. That is, the data processing system 28 may determine that the x-ray flux currently indicated by the first signal and the second signal is greater than or less than a desired x-ray flux. In response to determining this, the data processing system 28 may generate a signal correction, which may indicate a determined amount of photons 49 that are being emitted into the geological formation 14.

Accordingly, the present disclosure relates to a beam alignment system for a downhole tool that measures properties of a geological formation, such as a formation density. In general, the beam alignment system includes two or more photon flux detectors disposed at different radial positions about an axis normal to a surface of the target. Each detector of the two or more detectors measures a signal indicative of a photon flux at the respective position of the respective detector. A controller communicatively coupled to the two or more detectors may determine a condition associated with the electron beam (e.g., an alignment, a striking position of the electron beam on the target, and the like) of the downhole based at least in part on the respective signal measured by the two or more detectors. In some examples, the controller may determine the condition associated with the electron beam based at least in part on a respective position of the two or more detectors. In some example, the respective position of the two or more detectors may be different or substantially equal radial distances from the axis normal to a surface of the target. In some examples, the controller may generate and/or output a signal correction factor that may modify an expected output of the photons emitted by the detector. Additionally, or alternatively, the controller may generate and/or output a control signal that modifies a condition associated with the electron beam (e.g., modifying a voltage of an electron accelerator associated with the electron beam). As such, the beam alignment system of the present disclosure may improve the accuracy of certain downhole tools as well as improve the operations of the downhole tools while the downhole tools are within a wellbore.

The specific embodiments described above have been shown by way of example, and it should be understood that these embodiments may be susceptible to various modifications and alternative forms. It should be further understood that the claims are not intended to be limited to the particular forms disclosed, but rather to cover modifications, equivalents, and alternatives falling within the spirit and scope of this disclosure.

What is claimed is:

1. A downhole tool, comprising:
  a radiation generator configured to emit radiation, wherein the radiation generator comprises an electric photon generator comprising:
    a cathode configured to emit an electron beam; and a target configured to emit the radiation when struck by the electrons of the electron beam;
    a first flux detector at a first radial position about a longitudinal axis of the downhole tool, wherein the first flux detector is configured to measure a first signal indicative of a flux of the radiation, and wherein the first flux detector is disposed a first distance from a center of the target;
  a second flux detector at a second radial position about the longitudinal axis of the downhole tool, wherein the second flux detector is configured to measure a second signal indicative of the flux of the radiation, wherein the second flux detector is disposed at a second distance from the center of the target, wherein the second radial position is different from the first radial position, and wherein the second distance is different from the first distance; and
  a controller communicatively coupled to the first flux detector and the second flux detector, wherein the controller is configured to determine a condition associated with the radiation generator based at least in part on a relative flux from the first flux detector and the second flux detector.

2. The downhole tool of claim 1, wherein the radiation comprises x-ray photons.

3. The downhole tool of claim 2, comprising a third flux detector at a third radial position about the longitudinal axis of the downhole tool, wherein the third flux detector is configured to measure a third signal indicative of the flux of the radiation, and wherein the third flux detector is disposed at a third distance from the center of the target; and
  wherein the controller is communicatively coupled to the third flux detector and configured to determine the condition associated with the radiation generator based at least in part on the relative flux from the first flux detector, the second flux detector, and the third flux detector.

4. The downhole tool of claim 3, wherein:
the first distance and the third distance are equal; or
the second distance and the third distance are equal.

5. The downhole tool of claim 2, wherein the controller is configured to determine the condition associated with the radiation generator based at least in part on the first radial position and the second radial position.

6. The downhole tool of claim 1, wherein the controller is configured to determine a signal correction based at least in part on the determined condition associated with the radiation generator.

7. The downhole tool of claim 2, comprising:
a beam steering control system configured to direct the electron beam to the target; and wherein the controller is configured to output a control signal to the beam steering control system to modify a direction of the electron beam based at least in part on the determined condition associated with the electron beam.

8. A method, comprising:
receiving, via a processor, a first signal from a first detector, wherein the first signal is indicative of an x-ray flux of x-ray photons emitted by a target of a downhole tool, wherein the first detector is disposed at a first radial position to a longitudinal axis of the downhole tool, and wherein the first detector is disposed a first distance from a center of the target;
receiving, via the processor, a second signal from a second detector, wherein the second signal is indicative of the x-ray flux of x-ray photons emitted by the target, wherein the second detector is disposed at a second radial position relative to the longitudinal axis, wherein the second detector is disposed a second distance from the center of the target, wherein the second radial position is different from the first radial position, and wherein the second distance is different from the first distance;
receiving, via the processor, a third signal from a third detector, wherein the third signal is indicative of the x-ray flux of x-ray photons emitted by the target, wherein the third detector is disposed at a third radial position relative to the longitudinal axis, wherein the third detector is disposed a third distance from the center of the target, and wherein the third radial position is different from the first radial position and second radial position; and
determining, via the processor, a condition associated with electron beam on the target based at least in part on a relative flux of the first signal, the second signal, and the third signal.

9. The method of claim 8, wherein the condition associated with the electron beam comprises an alignment of the electron beam.

10. The method of claim 9, comprising generating, via the processor, a control signal to modify the alignment of the electron beam based at least in part on the determined alignment of the electron beam.

11. The method of claim 8, comprising determining, via the processor, a signal correction based at least in part on the determined condition associated with the electron beam.

12. The method of claim 8, wherein the condition associated with the electron beam comprises a position where the electron beam is striking the target.

13. The method of claim 8, comprising determining, via the processor, whether the condition associated with the electron beam indicates that the electron beam is misaligned; and
in response to determining that the electron beam is misaligned, outputting, via the processor, an alert signal.

* * * * *